United States Patent Office 3,395,547
Patented Aug. 6, 1968

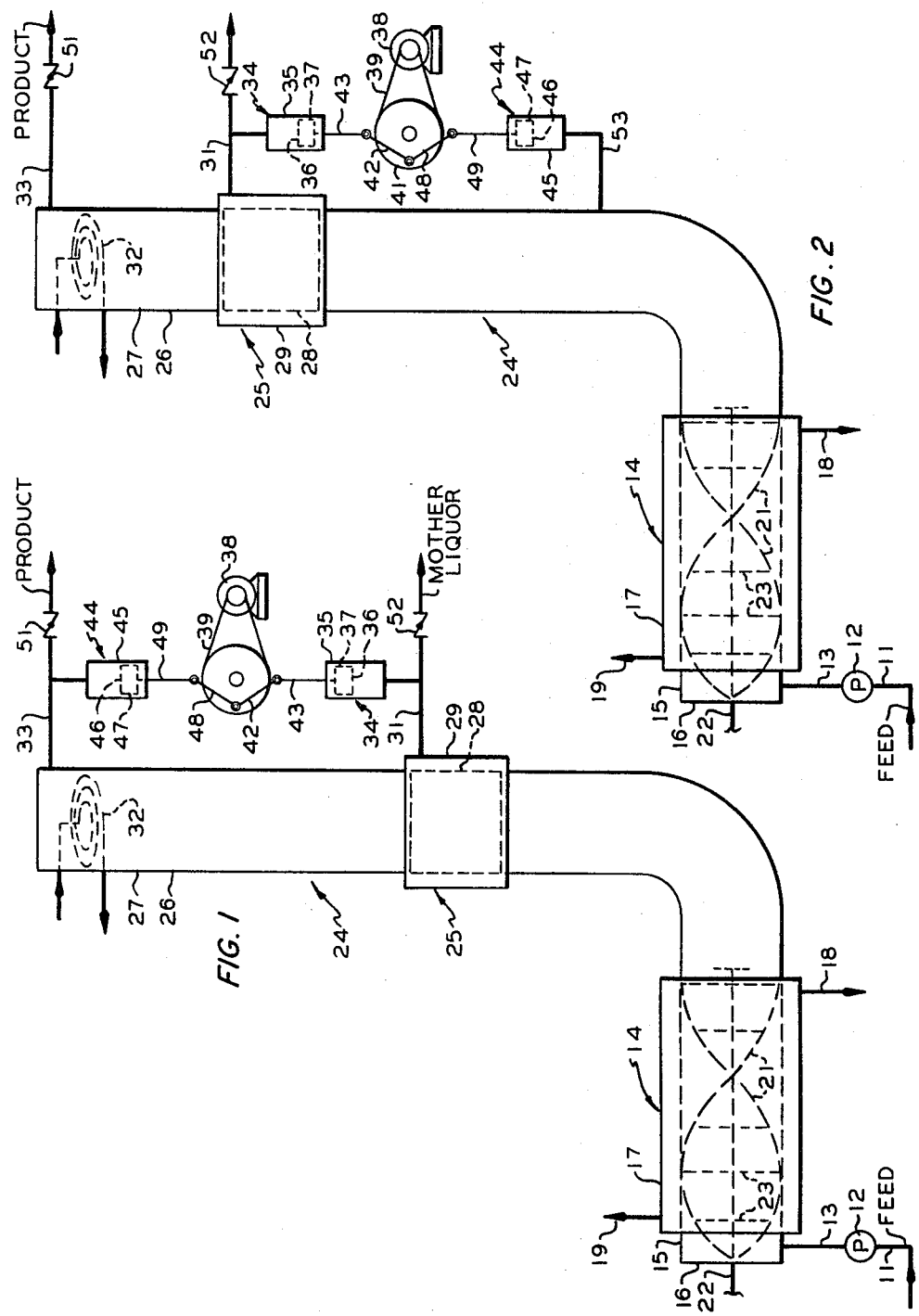

3,395,547
FRACTIONAL CRYSTALLIZATION SYSTEM
Frederick L. Stoller, Bartlesville, Okla., assignor to Phillips Petroleum Company, a corporation of Delaware
Filed June 28, 1962, Ser. No. 206,032
8 Claims. (Cl. 62—58)

ABSTRACT OF THE DISCLOSURE

In a fractional crystallization system comprising a column having a feed inlet, a filter, a reflux zone, a melting zone, and a mother liquor withdrawal conduit connected to the filter, a first series of pressure pulses is applied to the liquid contents of the column by means other than through the liquid contents of the mother liquor withdrawal conduit while a second series of pressure pulses is applied directly to the liquid contents of the mother liquor withdrawal conduit, the first and second series of pulses having a frequency in the range of 50 to 400 pulsations per minute and having a phase relationship to increase the pressure drop across the filter. The first and second series are preferably 180° out of phase with respect to each other.

---

This invention relates to method and apparatus for separating the components of a fluid mixture by means of fractional crystallization. In one aspect the invention relates to method and means for concentrating an aqueous solution with concomitant production of water separated from the solution. In another aspect the invention relates to the recovery of fresh water from sea water. In yet another aspect the invention relates to the concentration of aqueous solutions and dispersions such as orange juice, beer, milk and the like.

Purification by means of fractional crystallization has been known for a number of years. Schmidt Re. 23,810 (1954) discloses a process and apparatus for purifying crystals, which process involves moving a mixture of crystals and adhering liquid through a liquid removal zone, a reflux zone and a melting zone, removing liquid in said liquid removal zone, melting crystals in said melting zone, withdrawing part of the melt as product and forcing another part of the melt in a direction counter-current to the movement of crystals in said reflux zone. Thomas 2,854,494 (1958) discloses a process and apparatus for purifying crystals wherein a pulsating pressure is applied to the melt in the purification column. These processes are generally applicable to the separation of at least one pure component from any mixture which is resolvable into its components by fractional crystallization. For example, the processes can be used for the concentration of fruit juices, vegetable juices, and other materials which comprise aqueous solutions which can be concentrated by the formation and removal of ice crystals. The processes are also of great value in the resolution of non-aqueous mixtures, an example of such an application being the separation of para-xylene from a mixture thereof with the other xylene isomers and ethyl benzene.

However, in some fractional crystallization processes, it has been found that the mother liquor withdrawal rate tends to be lower than desirable and is not responsive to efforts to raise it by lowering the back pressure on the mother liquor withdrawal line. These difficulties appear to be pronounced at increased feed rates and with larger columns. It appears that these difficulties occur because the application of the pulsating pressure to the product withdrawal line does not provide sufficient driving force for filtration across the mother liquor filter screen. Insufficient driving force may result from the bed of crystals moving away as the pulse is applied, or from lack of sufficient filter backwash.

In accordance with the invention it has been discovered that these difficulties can be overcome through the utilization of a duplex pulsating pressure system where one of the pulsating pressures is applied to the product withdrawal line or to the column, and the other pulsating pressure is applied to the mother liquor withdrawal line. In a preferred embodiment the pulsating pressures are applied 180° out of phase with respect to each other. Thus, as a pulse is applied to the product withdrawal line or the column, suction is pulled on the mother liquor withdrawal line, thereby increasing the pressure drop across the mother liquor filter screen for better filtration as well as holding the crystal bed against the filter screen by the increased pressure drop discouraging movement of the crystal bed. When a pulse is applied to the mother liquor withdrawal line and a suction is pulled on the product withdrawal line or the column, a more effective backflushing of the mother liquor filter screen is accomplished.

Accordingly, it is an object of the invention to provide an improved method and apparatus for effecting the separation of components of a mixture. Another object of the invention is the provision of method and means for effecting a greater pressure drop across the mother liquor filter. A still further object of the invention is the provision of method and means for accomplishing a more effective backflushing of the mother liquor. Yet another object of the invention is to provide improved filtration of mother liquor from the crystal containing slurry. A still further object of the invention is the provision of means to help move the crystal bed through the column.

Other objects, aspects and advantages of the invention will be apparent from a study of the disclosure, the drawings and the appended claims to the invention.

In the drawings, FIGURE 1 sets forth a diagrammatic representation of a fractional crystallization system in accordance with a presently preferred embodiment of the invention; and FIGURE 2 sets forth a diagrammatic representation of a fractional crystallization system in accordance with a second embodiment of the invention.

In the drawings like elements will be referred to with like numerals wherever applicable in the figures which constitute the drawing.

Referring now to FIGURE 1 in detail, a feed mixture comprising two or more components, one of which is separable from the mixture by crystallization, is passed through conduit 11 and is forced by means of pump 12 through conduit 13 into chilling section 14. Chilling section 14 comprises an inner cylindrical shell 15 one end of which is closed by means of an end member 16, and a cooling jacket 17 having an inlet 18 and an outlet 19. Agitating or scraping means 21 are positioned within cylindrical shell 15 and are designed to prevent the accumulation of solid material on the inner surface of cylindrical shell 15. Scraping means 21 can be constructed of strips of metal or other suitable material known in the art and can be fabricated in the form of helix, as shown in the drawing, or can be straight. Any suitable form of scraping means 21 can be provided. Scraping means 21 are mounted on a rotatable shaft 22 by means of members 23. Shaft 22 is axially positioned within cylindrical shell 15 and is connected to any suitable source of power which rotates the scraping, such power source not being shown in the drawing. Shaft 22 is suitably sealed in end member 16 by means of a packing gland of any desired type known in the art. Cooling of the feed which enters chilling section 14 can be provided by passing a suitable coolant through inlet 18 and withdrawing the coolant through outlet 19. Sufficient cooling in chilling section 14 is provided so that a predetermined amount of solid crystals is produced from the feed passing therethrough. The resulting slurry of crystals in mother liquor is passed into purification column 24 which comprises filtration section 25, reflux section 26, and melting section 27. Filtration section 25 comprises a suitable filter screen or medium 28 and an external shell 29, the latter being provided with an outlet pipe 31 through which the filtrate, that is the mother liquor, is passed. Filter medium 28 can be of any desired type known in the art. For example it can comprise a metallic screen, a sintered perforate metal member or a perforate metal member supporting a filter cloth. It is desirable that the filter member 28 be positioned integrally with respect to adjacent walls of reflux section 26. Although filtration section 25 has been illustrated in the drawing as being an external filter, it is within the scope of the invention to utilize an internal filter, in which event, external shell 29 would be positioned integrally with respect to the wall of reflux section 26, and filter medium 28 would be disposed within shell 29 and preferably positioned axially with respect to purification column 24. The filtrate produced in filtration section 25 is removed from purification column through conduit 31. The remaining crystal mass is passed into reflux section 26 wherein it is countercurrently contacted with liquid reflux as subsequently described. As the crystal mass approaches heating element 32 in melting section 27, the crystals are melted. Heating element 32 can be in the form of an electrical heater or a heat transfer coil through which a suitably heated fluid is passed. Part of the melt produced by heating element 32 is withdrawn through product withdrawal conduit 33 as a purified product of the process. The remainder of the melt is forced back through reflux section 26 to form reflux which effects crystal purification. Although internal heating element 32 is illustrated, an external heater, for example, a heating jacket encompassing section 27 and provided with means for circulating a heating fluid therethrough can be utilized, if desired.

The pulsation-producing means 34 comprises a cylinder 35, one end of which is in fluid communication with mother liquor withdrawal conduit 31, and a reciprocatable piston 36 mounted within cylinder 35. Piston 36 is suitably sealed in cylinder 35, for example by means of rings 37, to prevent leakage of mother liquor. Reciprocation of piston 36 is produced by any suitable means, for example by an electrical motor 38, a belt 39, crank means 41 and connecting rods 42 and 43.

The pulsation-producing means 44 comprises a cylinder 45, one end of which is in fluid communication with product withdrawal conduit 33, and a reciprocatable piston 46 mounted within cylinder 45. Piston 46 is suitably sealed in cylinder 45, for example by means of rings 47, to prevent leakage of product. Reciprocation of piston 46 is produced by any suitable means, for example by connecting rods 48 and 49 connected to crank means 41. While the crystal mass is being advanced from chilling section 14 through filtration section 25 and reflux section 26 into melting section 27, piston 46 is reciprocated at a suitable rate, such as in the range of about 50 to about 400 pulsations per minute, so that a pulsation pressure is exerted on the melt reflux which is intermittently forced back, countercurrently with respect to the crystal mass, through reflux section 26. The dimensions of the cylinder and piston used to produce the back-pressure pulsation can vary over a rather wide range. It has been found that when a purification column 6 inches in diameter is used in conjunction with a two inch diameter piston for the separation of paraxylene from its isomers, the piston stroke can be in the range ½ to 2½ inches, preferably ¾ to 2 inches, and it has been found that a 1-inch stroke appears to produce optimum results in terms of ease and stability of operation. Optimum dimensions in any particular case can readily be determined by trial by those skilled in the art. It is to be understood that the dimensions, configurations, and frequencies stated above are not necessarily optimum for every material to be purified. A check valve 51 can be provided in product withdrawal line 33 to prevent the back flow of withdrawn product into the crystal purification column 24. A check valve 52 can be provided in mother liquor withdrawal line 31 to prevent the back flow of mother liquor which has been withdrawn to a point downstream of check valve 51. If desired one or both of check valves 51 and 52 can be replaced or augmented by suitable valve, such as solenoid valves, which are cyclically opened and closed in synchronism with the reciprocation of the respective one of pistons 36 and 46.

In a preferred embodiment pistons 36 and 46 are reciprocated 180° out of phase with respect to each other so that as a pulse is applied to product withdrawal line 33, suction is pulled on mother liquor withdrawal line 31. Such operation increases the pressure drop across filter medium 28 and results in more effective filtration with an increased flow of mother liquor. The increased pressure drop also aids in holding the crystal bed against the filter medium 28. When pulse is applied to mother liquor line and suction is applied to product line, movement of crystal bed through column is assisted. While the preferred relationship between pistons 36 and 46 is 180° out of phase, other phase relationships can be utilized.

While the system of FIGURE 1 has been illustrated with pulsating-producing means 44 connected to product withdrawal line 33, it is within the contemplation of the invention that pulsating-producing means 44 can be connected directly to melting section 27. Also in systems utilizing external reflux and/or the direct injection of refrigerant vapors instead of or in addition to the utilization of the heating element 32, it is within the contemplation of the invention to connect pulsating-producing means 44 to one or more of the melting section of the column, the product withdrawal line, the external reflux injection line and the refrigerant vapors injection line, the primary function in each case being to apply a pulsating pressure to the melt reflux and to the crystal mass.

A modification of the system of FIGURE 1 is illustrated in FIGURE 2 wherein pulsation-producing means 44 is connected by means of conduit 53 to purification column 24 at a point upstream of filtering section 25 for providing a driving force in the direction of the crystal bed movement. Again pulsation-producing means 44 is preferably operated at 180° out of phase with pulsation-producing means 34. While the pulsation-producing means 44 is preferably connected between chilling section 14 and filtering section 25, it is within the contemplation of the invention to connect pulsation-producing means 44 to feed conduit 13 and/or directly to chilling section 14.

It is also within the contemplation of the invention to utilize two or more pulsation-producing means in addition to the pulsation producing means connected to the mother liquor withdrawal line where one or more of the pulsation-producing means are connected upstream of filtering section 25 and one or more pulsation-producing means are connected downstream of filtering section 25. In such a system the pulsation producing means connected to the mother liquor withdrawal line is preferably operated substantially in phase with either the pulsation-producing means downstream of filtering section 25 or the pulsation-producing means upstream of filtering section 25 and substantially 180° out of phase with the other pulsation-producing means. However, other phase relationships can be utilized.

While the invention has been illustrated utilizing an indirect heat exchanging chiller section, it is within the contemplation of the invention to utilize direct heat exchange between a suitable refrigerant, such as butane, and the feed. While the invention has been disclosed in utilizing a pulsation-producing means connected directly to the column or a particular conduit, it is within the contemplation of the invention to utilize a piston separated from the column or conduit by means of an intermediate fluid, whereby the piston acts directly upon the intermediate fluid which in turn produces a pulsation of a flexible diaphragm sealed within the column or conduit. While the pulsation producing means are preferably operated in a regular or periodic manner, it is within the contemplation of the invention to operate the pulsation producing means in an irregular or non-periodic manner. Also, electrical, pneumatic or hydraulic actuation of the pulsating mechanism can be utilized in place of purely mechanical actuation.

As a general rule, the solids content of the mixture fed from the chiller into the purification column is within the range of about 20 to about 50 weight percent, and preferably in the range of about 25 to about 40 weight percent. However, solids contents outside the stated ranges can be used.

The invention is applicable to the resolution of non-aqueous mixtures, an example of which being the separation of para-xylene from a mixture thereof from other xylene isomers and ethyl benzene. The invention is also applicable to the production of fresh water from brine, and to the concentration of aqueous solutions, examples of which include fruit juices, vegetable juices, and beverages.

*Specific example*

A mixture of methanol and water, which was utilized to simulate the concentration of beer by crystallization, was passed through chiller 14 wherein the mixture was cooled to a temperature of 20° F. by evaporation of liquid propane in the chiller jacket. The slurry of ice crystals in the liquid methanol concentrate thus produced contained 21 weight percent in crystals. The thick slurry was passed into a 6 inch diameter pulsed column of the type described in Thomas 2,854,494. In a first run the water product stream only was pulsed at a rate of 50 strokes per minute with a 9.8 cubic inch displacement. In a second run the water product stream was pulsed at a rate of 50 strokes per minute with a 9.8 cubic inch displacement and the mother liquor withdrawal stream was pulsed at a rate of 50 strokes per minute with a 2.4 cubic inch displacement. Other conditions and the results are shown in Table I.

TABLE I

| Gallons per hour | Pulsing Water Product Stream Only | Pulsing Both Water Product Stream and Mother Liquor Withdrawal Stream |
|---|---|---|
| Feed flow, g.p.h | 27.7 | 25.0 |
| Mother liquor flow, g.p.h | 21.0 | 18.0 |
| Water product flow, g.p.h | 6.7 | 7.0 |
| Vol. percent recovery of water from feed | 24.2 | 28.0 |
| Wt. percent methanol in feed | 8.0 | 7.9 |
| Wt. percent methanol in mother liquor | 10.7 | 10.4 |
| Wt. percent methanol in water product | 1.3 | 0.12 |

Thus pulsing both the water product stream and the mother liquor withdrawal stream resulted in a more complete separation of the mixture, that is, a lower concentration of methanol in the water product stream, and an increase in the percentage of water recovered from the feed.

Reasonable variations and modifications are possible within the scope of the disclosure, the drawings and the appended claims to the invention.

I claim:

1. In a process in which crystals and adhering mother liquor are continuously passed as a slurry from a chilling zone into a crystal purification zone comprising a filtering zone having a mother liquor filter which has first and second sides, a reflux zone and a melting zone so that the slurry from said chilling zone is passed into said filtering zone and into contact with said first side of said mother liquor filter, a stream of mother liquor being withdrawn from said second side of said mother liquor filter, the crystals and any remaining mother liquor are passed from said filtering zone into said reflux zone, the crystals are passed from said reflux zone into said melting zone wherein the crystals are melted to obtain a melt, a portion of the melt is withdrawn as a product stream, and the remainder of the melt is passed countercurrently to the movement of crystals as reflux therefor; the improvement comprising applying on said first side of said mother liquor filter a first series of pressure pulses having a frequency in the range of 50 to 400 pulsations per minute to the fluid contents of said crystal purification zone, and applying on said second side of said mother liquor filter a second series of pressure pulses having a frequency in the range of 50 to 400 pulsations per minute directly to said stream of mother liquor, said first and second series of pressure pulses being substantially 180° out of phase with each other at said mother liquor filter to increase the pressure differential across said mother liquor filter over that which would be obtained with only one of said first and second series of pulses.

2. A process in accordance with claim 1 wherein said first series of pulses is applied through said product stream.

3. A process in accordance with claim 1 wherein said first series of pulses is applied to said slurry upstream of said filtering zone.

4. A crystal purification apparatus comprising: a purification column having a filtering section, a reflux section and a melting section; chilling means for converting the feed mixture into a slurry of crystals and mother liquor; means for introducing the feed mixture into said chilling means; means for passing the resulting slurry from said chilling means into said filtering section; a filtering medium located in said filtering section and having a first side and a second side with a filtrate outlet connected to said second side; a mother liquor withdrawal line in fluid communication with said filtrate outlet for the withdrawal of a stream of mother liquor; heating means in heat exchanging relationship with said melting section; a product withdrawal line in fluid communication with said melting section; means for applying on said first side of said filtering medium a first series of pulses having a frequency in the range of 50 to 400 pulsations per minute to the fluid contents of said purification column; and means for applying on said second side of said filtering medium a second series of pulses having a frequency in the range of 50 to 400 pulsations per minute directly to the fluid contents of said mother liquor withdrawal line, said first and second series of pulses being substantially 180° out of phase with each other to increase the pressure differential across said filtering medium over that which would be obtained with only one of said first and second series of pulses.

5. Apparatus in accordance with claim 4 wherein said means for applying a first series of pulses is operatively connected to said product withdrawal line.

6. Apparatus in accordance with claim 4 wherein said means for applying a first series of pulses is operatively connected to said means for passing.

7. A crystal purification apparatus comprising: a purification column having a filtering section, a reflux section and a melting section; chilling means for converting the feed mixture into a slurry of crystals and mother liquor; pump means for introducing the feed mixture into said chilling means and for passing the resulting slurry from said chilling means into said filtering section; a filtering medium located in said filtering section and having a first side and a second side with a filtrate outlet connected to said second side of said filtering medium; a mother liquor withdrawal line connected to said filtrate outlet; heating means is heat exchanging relationship with said melting section; a product withdrawal line in fluid communication with said melting section; means located outside of said purification column for applying a first series of pulses having a frequency in the range of 50 to 400 pulsations per minute to the fluid contents of said purification column; said means for applying a first series of pulses being directly connected to one of said product withdrawal line and said melting section; means for applying a second series of pulses having a frequency in the range of 50 to 400 pulsations per minute directly to the fluid contents of said mother liquor withdrawal line; and means for applying a third series of pulses having a frequency in the range of 50 to 400 pulsations per minute to the contents of said purification column; said means for applying a third series of pulses being connected at a point upstream of said filtering medium with regard to the direction of movement of crystals, said first and third series of pulses being substantially in phase with each other at said first side of said filtering medium and substantially 180° out of phase with said second series of pulses at said second side of said filtering medium to increase the pressure differential across said filtering medium over that which would be obtained with pulsations applied to only one side of said filtering medium.

8. In a crystal purification process wherein a feed stream to be purified is introduced into a chilling zone and therein converted into a slurry of crystals and mother liquor, the resulting slurry is continuously passed from said chilling zone nito the filtering section of a purification zone also comprising a reflux section and a melting section, said filtering section containing a mother liquor filter having a first side and a second side, a stream of mother liquor is withdrawn from said second side of said mother liquor filter, heat is introduced into said melting section, and a product stream is withdrawn from said melting section; the improvement comprising applying on said first side on said mother liquor filter a first series of pulses having a frequency in the range of 50 to 400 pulsations per minute directly to the contents of said purification zone, and applying on said second side of said mother liquor filter a second series of pulses having a frequency in the range of 50 to 400 pulsations per minute directly to said stream of mother liquor, said first and second series of pulses being substantially 180° out of phase with each other at said mother liquor filter such that as a pulse of said first series is applied to the contents of said purification zone, suction is pulled on said stream of mother liquor by said second series of pulses, thereby increasing the pressure differential across said mother liquor filter, and as a pulse of said second series is applied to said stream of mother liquor, suction is pulled on the contents of said purification zone to provide a more effective backflushing of said mother liquor filter.

References Cited

UNITED STATES PATENTS

| | | | |
|---|---|---|---|
| 2,613,136 | 10/1952 | McKay | 23—273 |
| 2,815,288 | 12/1957 | McKay | 99—205 |
| 2,890,938 | 6/1959 | Rush | 23—273 |
| 2,891,099 | 6/1959 | Skinner | 62—58 |
| 2,977,234 | 3/1961 | Wenzelberger | 99—205 |
| 3,234,747 | 2/1966 | McMahon | 62—58 |

NORMAN YUDKOFF, *Primary Examiner.*

G. P. HINES, *Assistant Examiner.*